F. JACOBS.
HUSKING, SNAPPING, AND SHOCKING DEVICE.
APPLICATION FILED SEPT. 19, 1919.
1,346,894.
Patented July 20, 1920.
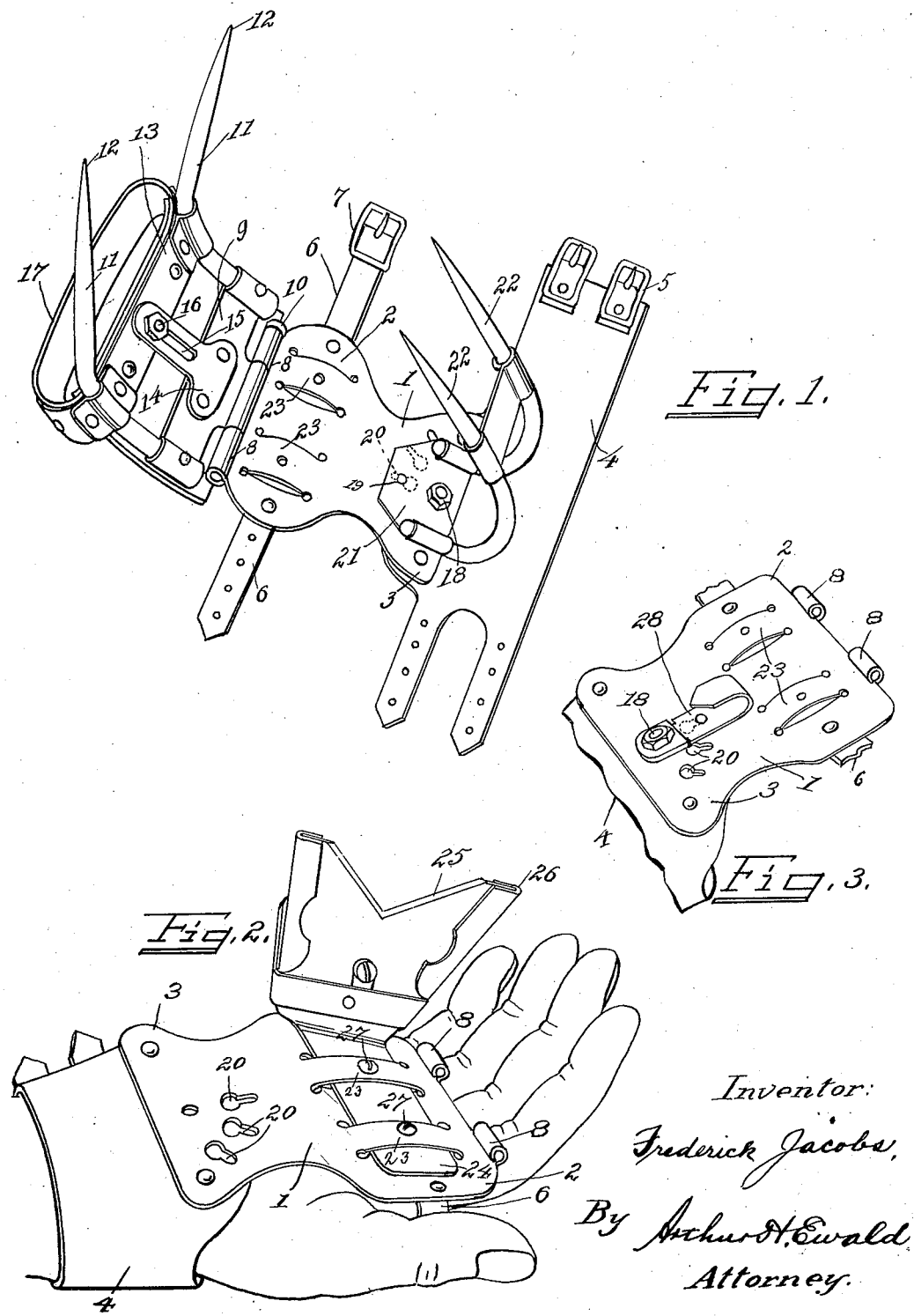

UNITED STATES PATENT OFFICE.

FREDERICK JACOBS, OF CINCINNATI, OHIO.

HUSKING, SNAPPING, AND SHOCKING DEVICE.

1,346,894.  Specification of Letters Patent.  Patented July 20, 1920.

Application filed September 19, 1919. Serial No. 324,739.

*To all whom it may concern:*

Be it known that I, FREDERICK JACOBS, a citizen of the United States, and resident of Cincinnati, county of Hamilton, and State of Ohio, have invented a certain new and useful Husking, Snapping, and Shocking Device, of which the following is a full, clear, and exact description, reference being had to the accompanying drawings, forming a part of this specification.

My invention relates to a new and improved device or implement for husking, snapping and shocking corn, wheat and similar produce.

The principal object of the present invention is to provide a simple and efficient device which may be attached to the hand of the operator, and by means of which the several operations of snapping, husking and shocking corn and grains may be efficiently and expeditiously performed.

Other objects of the present invention will appear from the following detailed description thereof.

In the drawings:—

Figure 1 is a perspective of my new device.

Fig. 2 is a perspective of the device secured to the hand of the operator with the snapping blade or tool attached.

Fig. 3 is a perspective of the device with the husking tool attached.

The numeral 1 indicates a plate having a portion 2 arranged to extend into and rest within the palm of the operator's hand, as indicated clearly in Fig. 2 of the drawings, and a portion 3 which extends approximately to the user's wrist. Secured to the end portion 3 of the plate 1 is a strap or wristlet 4 having buckles 5 by means of which the plate 1 is secured to the wrist of the operator. The end portion 2 of the plate 1 is provided with a strap and buckle 6 and 7 respectively, which are arranged to be secured around the hand, and by means of which, in conjunction with the wristlet 4, the plate 1 is securely maintained in position. The end of the plate 1 is provided with knuckles 8, through which a plate 9 may be hingedly secured to the plate 1 by means of a removable pin 10. Secured in the plate 9 are prongs 11 having pointed ends 12. A brace plate 13 is slidably mounted on the prongs 11, and may be adjusted with reference thereto. Riveted to the plate 9 is a plate 14 having a slot 15. A bolt 16, arranged to pass through the slot 15 and a suitable perforation in the plate 13, is provided for the purpose of securing the plate 13 in any desired adjustment. The plate 13 is provided with a loop 17 arranged to fit around the fingers of the operator so that the prongs 11 may be caused to move with the operator's fingers during the opening and closing of the hand. Arranged to be secured on the end portion 3 of the plate 1 by means of a bolt 18 and pin 19, which fits in a slot or perforation 20, is a plate 21 carrying a pair of prongs 22, arranged to coöperate with the prongs 11 during the opening and closing of the hand.

The device as provided with the end plate 9 and prongs 11—11, and 22—22, is adapted to be used in the shocking of wheat or other grains. In order that the device may also be suitable for the other purposes hereinbefore mentioned, the plate 9 with prongs 11—11 may be removed by withdrawing the pin 10. The plate 1 is provided with slits forming straps 23 which are bent slightly upward from the body of the plate to receive the shank 24 of a corn snapping or cutting blade 25, which is securely mounted in a holder 26. The blade 25 is V-shaped as shown and extends at right angles from the shank 24. The shank is secured under the straps by means of screws 27. When provided with the blade 25, the device is arranged to be used for the snapping or cutting of corn from the stalks.

For husking purposes, I provide a hook or prong 28 which may be secured by means of the bolt 18, and a pin which extends through either of the perforations 20, at any suitable angle of disposition with reference to the plate 1.

From the foregoing description, the nature and value of my new device will be apparent to those skilled in the art to which the same appertains. When the device is to be used for cutting or snapping corn, the husker 28 as well as the plate 9 and prongs 11—11 together with prongs 22 are removed, the blade 25 is then attached as above set forth, whereupon the ears may be suitably grasped by the hand and snapped or cut off by means of the blade. For husking the ears, the blade 25 is removed and the husker 28 secured to the plate 1 at the desired angle, when the sharpened hooked end of the husker may be used in the ordinary manner for husking the ears. For shocking wheat or other grains, the plate 9 with the prongs 11—11 is secured to the plate 1 by means of the pin 10. The prongs 22 are also secured to the plate 1 in the manner above set forth. The strap 17 and brace plate 13 are suitably adjusted to fit the device to the hand of the operator, after which the hand with the device attached, may be used in the ordinary manner for gripping the bundles of grain between the two pairs of prongs. It will thus be seen that while the present device is of extreme simplicity and hence inexpensive in manufacture, the same lends itself to a variety of operations, each of which may be conveniently and expeditiously performed by its use. It is made in pairs for right and left hand.

Having thus fully described my invention what I claim as new, and desire to secure by Letters Patent is:—

1. A device of the character specified, comprising a plate, means for securing said plate to the hand, a second plate hingedly secured to said plate, and prongs secured to each of said plates, said prongs being so disposed as to coöperate for gripping purposes.

2. A device of the character specified, comprising a plate, means for securing said plate to the hand, a second plate hingedly secured to said plate, prongs secured to each of said plates, said prongs being so disposed as to coöperate for gripping purposes, and a brace plate arranged to be slidably secured to the prongs on said second plate.

3. A device of the character specified, comprising a plate, means for securing said plate to the hand, a second plate hingedly secured to said plate, prongs secured to each of said plates, said prongs being so disposed as to coöperate for gripping purposes, a brace plate arranged to be slidably secured to the prongs on said second plate, and a strap secured to said brace plate and arranged to fit around the fingers of the hand.

FREDERICK JACOBS.